C. W. SVENSON.
FLEXIBLE TUBING.
APPLICATION FILED FEB. 9, 1914.
1,140,417.
Patented May 25, 1915.
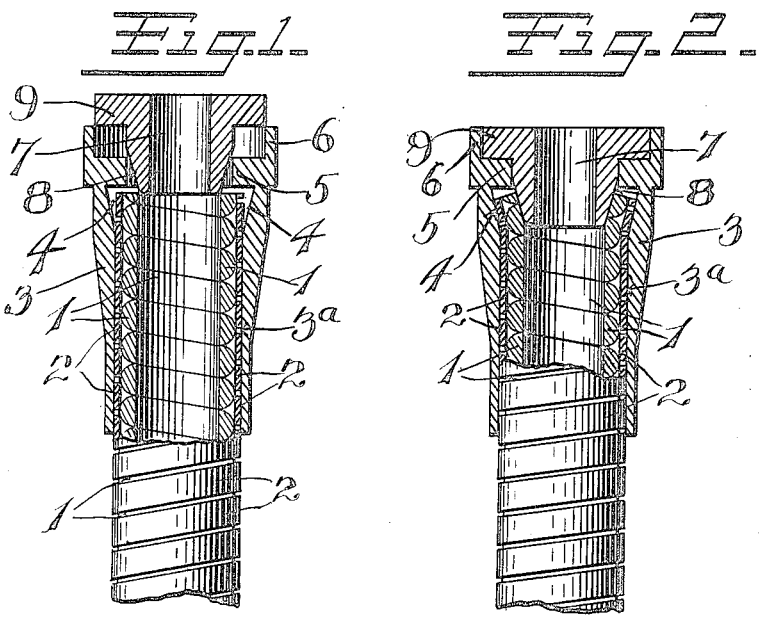
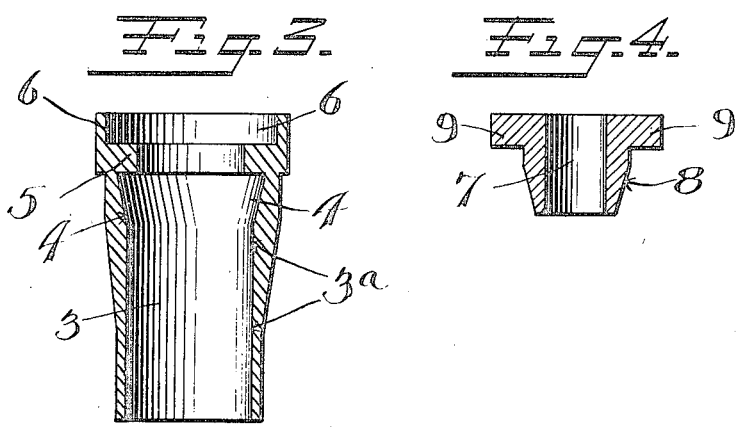
Witnesses:
Chas M Peard
Ida M Hunziker
Inventor
C. W. Svenson
By his Attorneys

UNITED STATES PATENT OFFICE.

CHARLES WALFRID SVENSON, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

FLEXIBLE TUBING.

1,140,417.  Specification of Letters Patent.  Patented May 25, 1915.

Application filed February 9, 1914. Serial No. 817,452.

*To all whom it may concern:*

Be it known that I, CHARLES W. SVENSON, a citizen of the United States, residing at New Britain, Hartford county, State of Connecticut, have invented certain new and useful Improvements in Flexible Tubing, of which the following is a full, clear, and exact description.

This invention relates to flexible shafting or tubing, and more particularly to means for coupling or interlocking a sleeve member to one end of such a flexible tubing.

The flexible tubing of the present invention is of a construction more particularly adapted for use in connection with transmission for speedometers and the like, but is, of course, not necessarily limited to this particular use, the tubing serving as a guide and covering for flexible transmission shafting which extends from the driving pinion to the speedometer mechanism itself.

In the drawings forming part of this specification and illustrating a preferable embodiment of the invention: Figure 1 illustrates a longitudinal sectional view of a tubing end and a sleeve member therefor, with the parts disconnected and positioned for connection. Fig. 2 is a longitudinal sectional view showing the wedging member inserted into coöperative wedging relation with the tubing and sleeve. Figs. 3 and 4 are longitudinal sectional views, respectively of the sleeve member and wedge member.

Referring to the drawings by numerals, 1 indicates an inner flexible tubing formed, for instance, of spiral metal tape which may take the form of a coiled spring. 2 designates the usual protecting tape incasing the same, and also preferably spirally wound thereon. These parts merely represent a conventional form of flexible tubing of the spiral type, the invention by no means being limited to this special form of tubing. The end of this tubing is inserted within a sleeve member 3 having its forward portion 3ª of a diameter, preferably, to snugly fit over the end of the tubing. Adjacent its outer end the sleeve member is internally beveled as at 4 to increase the internal diameter of the sleeve and is provided adjacent its outer end with an annular internal flange 5, the extremity 6 of the sleeve member forming a wall about said flange. The end of the tubing is inserted within the sleeve for a sufficient distance to bring the end of the tubing adjacent the annular flange 5. A wedge member is then inserted within the sleeve and within the tubing to wedge the end of the tubing between said member and the sleeve. The wedging means I preferably employ comprises a tubular wedging member 7 having a beveled outer periphery 8 and an annular base 9 of a diameter which will make it substantially coincident, preferably, with the internal diameter of the sleeve end 6. This wedge member is driven by a straight longitudinal movement into the outer end of the sleeve so that the beveled periphery 8 will engage with the end of the tubing 1 and will, by reason of its bevel, wedge said tubing firmly between its periphery and the interior of the sleeve member, or from the position shown in Fig. 1 of the drawings to that shown in Fig. 2. In this position it will be noted that the flange 5 acts as a stop abutment and seat for the base or head 9, and that the annular wall 6 acts as a locking or holding abutment for said head 9. In order to securely hold the wedge member in this position, various means may be employed. I prefer to make the diameter of the base 9 of the wedge sufficiently great to give it a tight friction fit with the end 6 of the sleeve so that it may be driven therein and firmly held. However, other equivalent means may be used, such, for instance, as extending the end 6 and turning it inwardly over the inserted base 9 of the wedge.

From the foregoing it will be seen that when the wedge is inserted, the bevel 8 of its periphery will act to securely clamp the end of the tubing 1 and its rustless casing 2, if one be used, between the base of the wedge member and the inner face of the sleeve. The wedge member being securely held against movement relative to the sleeve and itself holding the flexible tubing securely clamped to the sleeve, will, therefore, provide an immovable end connection for the tubing and one which is of comparatively simple structure and comparatively easy to assemble. It will be, of course, understood that the form of the wedge may be varied rather widely; also that while a specific embodiment of the invention has been shown, variation both in structure and relative arrangement of parts may be had within the spirit of the invention and the scope of the appended claim.

I should add that the sleeve member 6 in the case of flexible tubing of speedometers and the like is usually formed and arranged to be secured to suitable parts of the speedometer and motion transmitting mechanism, such, for instance, as the speedometer casing and the casing for the driving pinion.

What I claim, therefore, and desire to secure by Letters Patent is:

In a device of the character described, a flexible spiral tubing, a sleeve inclosing the outer face of said tubing at one end thereof, said sleeve having an internal annular flange adjacent one end thereof, and having its internal face beveled at a point adjacent to said flange, and a hollow plug inserted within said tubing end, said plug having an external bevel portion coöperating with said sleeve bevel and with that portion of the tube between said bevels to wedge adjacent walls of said tubing between said plug and sleeve bevels, said plug also having a plain surfaced head arranged to seat against said sleeve flange and to be frictionally engaged with and held by the inner face of said sleeve.

CHARLES WALFRID SVENSON.

Witnesses:
 GEO. P. SPEAR,
 M. G. STRONG.